US009188161B2

(12) United States Patent
Bouron et al.

(10) Patent No.: US 9,188,161 B2
(45) Date of Patent: Nov. 17, 2015

(54) ROLLING BEARING COMPRISING AT LEAST ONE MULTIPART RING, NOTABLY FOR A WIND TURBINE, AND ASSOCIATED MOUNTING METHOD

(71) Applicants: Cyril Bouron, Puits de Courson (FR); Jean-Baptiste Magny, Chevannes (FR); Pascal Ovize, Chitry le Fort (FR)

(72) Inventors: Cyril Bouron, Puits de Courson (FR); Jean-Baptiste Magny, Chevannes (FR); Pascal Ovize, Chitry le Fort (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/224,924

(22) Filed: Mar. 25, 2014

(65) Prior Publication Data

US 2015/0275971 A1    Oct. 1, 2015

(51) Int. Cl.
| F16C 19/54 | (2006.01) |
| F16C 19/38 | (2006.01) |
| F16C 33/60 | (2006.01) |
| F16C 43/06 | (2006.01) |

(52) U.S. Cl.
CPC .............. *F16C 33/60* (2013.01); *F16C 19/385* (2013.01); *F16C 43/06* (2013.01)

(58) Field of Classification Search
CPC .......... F16C 19/34; F16C 19/38; F16C 25/06; F16C 33/36; F16C 43/06; F16C 33/3706; F16C 2300/14

USPC ......... 384/450, 447, 501, 504–506, 513, 562, 384/548, 565, 559, 570, 507, 619, 622; 29/898.07
See application file for complete search history.

(56) References Cited

U.S. PATENT DOCUMENTS

| 1,121,208 | A | * | 12/1914 | Sultemeyer | 384/504 |
| 1,430,319 | A | * | 9/1922 | Parker | 384/498 |
| 1,795,471 | A | * | 3/1931 | Buckwalter | 384/564 |
| 2,130,379 | A | * | 9/1938 | Roland | 384/565 |
| 2,447,928 | A | * | 8/1948 | Bergstrom | 384/571 |
| 3,948,578 | A | | 4/1976 | Martin | |
| 3,967,867 | A | * | 7/1976 | Richardson | 384/582 |
| 4,798,482 | A | * | 1/1989 | Kruk | 384/571 |
| 4,906,113 | A | * | 3/1990 | Sague | 384/507 |
| 5,104,239 | A | * | 4/1992 | Sague | 384/448 |
| 5,114,248 | A | * | 5/1992 | Harsdorff | 384/473 |
| 5,954,609 | A | * | 9/1999 | Fecko | 475/162 |
| 5,961,221 | A | * | 10/1999 | Kamimura | 384/447 |
| 5,975,762 | A | * | 11/1999 | Ai | 384/450 |
| 8,002,472 | B2 | * | 8/2011 | Craig et al. | 384/455 |
| 8,579,511 | B2 | * | 11/2013 | Kikuchi | 384/447 |
| 2011/0027086 | A1 | | 2/2011 | Zeidlhack | |

FOREIGN PATENT DOCUMENTS

| DE | 102010023356 A1 | 12/2011 |
| FR | 2222897 A5 | 10/1974 |
| JP | H0544720 A | 2/1993 |

\* cited by examiner

*Primary Examiner* — Marcus Charles
(74) *Attorney, Agent, or Firm* — Bryan Peckjian; SKF USA Inc. Patent Dept.

(57) ABSTRACT

The rolling bearing provides an inner ring 14, an outer ring 16 and a plurality of rows of rolling elements 18, 20 each arranged between the raceways which are arranged on the rings, the number of rows of rolling elements $N_{rows}$ being in excess of or equal to two. At least one of the inner and outer rings 14, 16 includes a plurality of part rings 30, 32, 34 which are mounted bearing axially against one another. The number of part rings $N_{rings}$ is defined by $N_{rings} \geq N_{rows}+1$.

14 Claims, 3 Drawing Sheets

ROLLING BEARING COMPRISING AT LEAST ONE MULTIPART RING, NOTABLY FOR A WIND TURBINE, AND ASSOCIATED MOUNTING METHOD

CROSS-REFERENCE TO RELATED APPLICATIONS

This application claims priority to French Patent Application No. FR1352634 filed on Mar. 25, 2013.

FIELD OF THE INVENTION

The present invention concerns the area of rolling bearings, in particular rolling bearings comprising an outer ring, an inner ring and at least two rows of rolling elements, such as rollers, which are arranged between the rings. More especially, the invention concerns the area of large diameter rolling bearings, notably those utilized in wind turbines or even in tunnel boring machines, such as tunnellers or excavators.

BACKGROUND OF THE INVENTION

Such a rolling bearing generally comprises two rings, an inside one and an outside one, and at least two rows of angular contact rollers which are arranged between the roller raceways of the rings so as to withstand axial and radial forces at the same time. Such a bearing can also withstand elevated overturning moments.

In order to allow the rows of rollers to be mounted radially between the rings, mounting openings are generally provided which radially cross the thickness of one of the rings and open out into the raceways which are arranged on the ring. Sealing plugs are mounted inside the openings and form locally the raceways for the rollers.

The presence of such plugs in the loaded zones of the rolling bearing is a problem insofar as the admissible axial and radial forces are reduced. Moreover, the disadvantage of the solution is that it requires a large number of operations to introduce the rows of rollers and to fix the sealing plugs. Furthermore, the mounting openings promote further dimensional deformation of the ring during heat treatment of the ring, notably for bearings with large diameters.

The present invention aims to overcome these drawbacks.

SUMMARY OF THE INVENTION

More particularly, the present invention aims to provide a rolling bearing which is simple to produce and to mount and which allows elevated axial and/or radial forces to be withstood.

In one embodiment, the rolling bearing comprises an inner ring, an outer ring and a plurality of rows of rolling elements each arranged between the raceways which are arranged on the rings, the number of rows of rolling elements $N_{rows}$ being in excess of or equal to two. At least one of the inner and outer rings comprises a plurality of part rings which are mounted bearing axially against one another. The number of part rings $N_{rings}$ is defined by $N_{rings} \geq N_{rows}+1$.

In an advantageous manner, each part ring of the ring comprises at least one radial mounting surface bearing axially against a corresponding radial mounting surface of one of the other part rings. In a preferred manner, the rolling elements of each row extend axially on both sides of the radial mounting surface of the associated part ring.

At least one of the part rings of the ring can comprise two raceways for two adjacent rows of rolling elements. In the conditions, in an advantageous manner the part ring can have a mechanical strength in excess of that of other part rings of the ring.

In one embodiment, the rolling elements of each row are in direct contact with the associated raceway of the inner and outer rings.

In an advantageous manner, at least the raceways of the ring are continued in the circumferential direction.

In a preferred manner, the bearing comprises means for assembling the part rings of the ring, it being possible, for example, for the mounting means to comprise at least one fixing screw which extends axially within the thickness of the ring.

In one embodiment, the rolling elements are angular contact rollers suited for withstanding radial and axial stresses at the same time. At least two of the part rings of the ring can each comprise a guide face which forms support for an end face of each roller.

In one embodiment, each of the inner and outer rings comprises a plurality of part rings mounted bearing axially against one another, the number of part rings of each ring being defined by $N_{rings} \geq N_{rows}+1$.

The invention also concerns a method for mounting a rolling bearing such as defined previously in which a first row of rolling elements is mounted between a first part ring of the ring and the other ring, a second part ring of the ring is mounted bearing axially against the first part ring on the side of the first row of rolling elements, a second row of rolling elements is mounted between the second part ring and the other ring on the side axially opposite to the first row of rolling elements, then a third part ring of the ring is mounted bearing axially against the second part ring on the side of the second row of rolling elements.

BRIEF DESCRIPTION OF THE DRAWINGS

The present invention will be better understood by reading the detailed description of the embodiments which are taken by way of example, are in no way limiting and are illustrated by the accompanying drawings, in which.

DETAILED DESCRIPTION OF THE INVENTION

Figure 1:
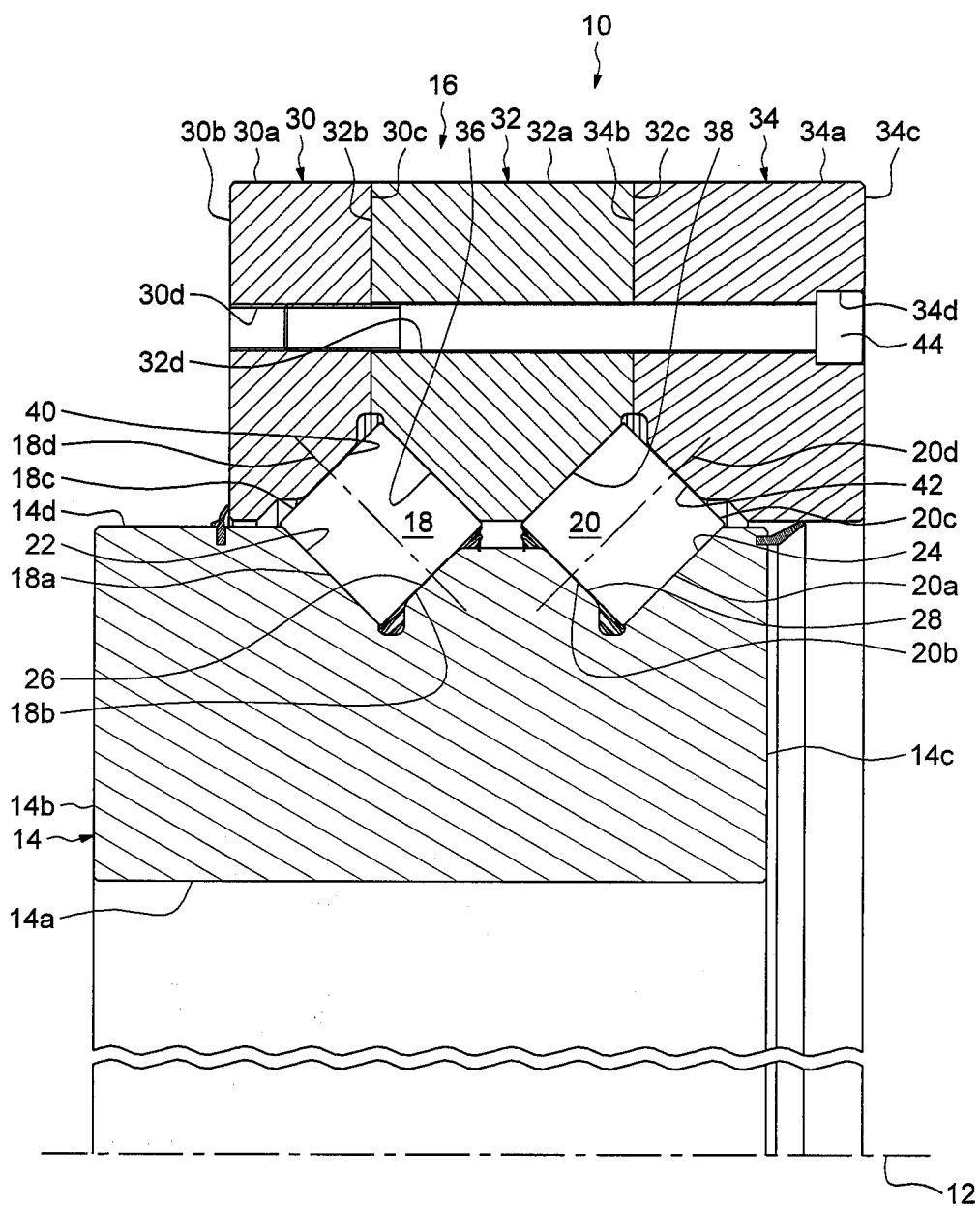
FIG. 1 is an axial sectional half-view of a rolling bearing according to a first embodiment of the invention.

In FIG. 1, the large diameter rolling bearing 10 can be utilized notably in wind turbines or in tunnel boring machines. The rolling bearing 10, with axis 12, comprises an inner ring 14, an outer ring 16 and two rows of angular contact rollers 18, 20 which are arranged between the rings. The inner 14 and outer 16 rings are concentric and extend axially along the axis of rotation 12 of the bearing. The inner ring 14 is solid. The term <<solid ring>> refers to a ring, the form of which is obtained by machining with the swarf worked away (turning, rectifying) from tubes, bars and forged and/rolled blanks. As will be described in more detail below, the outer ring 16 is designed notably so as to facilitate the mounting of the rollers 18, 20 in the annular space which is delimited radially between the rings.

The rollers 18, 20 of the bearing are themselves identical and each comprise an outer rolling surface 18a, 20a and two opposite end faces 18b et 18c, 20b and 20c which delimit the outer rolling surface axially, with respect to the axis of rotation 18d, 20d of the roller. In the embodiment shown, the rolling surfaces 18a, 20a are cylindrical. As an alternative to this, the rolling surfaces can have a spherical or logarithmic profile. In the embodiment shown, the angle formed between the axes of rotation 18d, 20d of the rollers is equal to 90°. The angle formed between each axis of rotation 18d, 20d and the axis 12 of the bearing is approximately equal to 45°. As an alternative to this, the angle could be between 20° and 70° inclusive.

The inner ring 14 is realized in one single piece or part and comprises a bore 14a which is intended to be mounted on a frame or a structure of a machine (not shown) and is delimited axially by two opposite lateral radial surfaces 14b, 14c. The inner ring 14 also comprises a staged outer surface 14d on which are formed first and second annular inner roller tracks or raceways 22, 24. The raceways 22, 24 are themselves symmetrical with regard to a transverse radial plane passing between the rows of rollers 18, 20. The raceways 22, 24 are continued in the circumferential direction. Each raceway 22, 24 extends obliquely toward the interior from the cylindrical outer surface 14d and is in the form of a truncated cone. In a straight section, each raceway 22, 24 has a straight inner profile which is in linear contact with the surface of the roller 18a, 20a of each of the rollers 18, 20.

The inner ring 14 also comprises annular guide faces 26, 28 which are formed on the outer surface 14d and are able to bear axially with the outer faces 18b, 20b of the rollers, with respect to the axes of rotation 18d, 20d. The guide faces 26, 28 are themselves symmetrical with regard to the transversal radial plane passing between the rows of rollers 18, 20. Each guide face 26, 28 is rectilinear and is arranged perpendicularly with respect to the associated raceway 22, 24 by being connected to the small diameter edge of the raceway by a concave throat. Each guide face 26, 28 extends obliquely toward the exterior from the throat and is connected to the outer surface 14d of the inner ring. The guide faces 26, 28 extend radially with regard to the axes of rotation 18d, 20d of the rollers. Each guide face 26, 28 and the associated raceways 22, 24 delimit a V-shaped groove which is oriented radially toward the exterior.

The outer ring 16 is formed by the assembling of three part rings 30, 32, 34 which are mounted bearing axially against one another. The outer ring 16 is subdivided in the axial direction by the three part rings 30 to 34. The part ring 30 forms an intermediate middle ring and the two part rings 32, 34 form the end rings which bear axially against the middle ring on both sides. The part rings 30 to 34 are the solid type.

Each part ring 30, 32, 34 comprises a cylindrical outer surface 30a, 32a, 34a which is delimited axially by two opposite lateral radial surfaces 30b and 30c, 32b and 32c and 34b and 34c. The part ring 30 is mounted bearing axially against the part ring 32 on the side opposite the part ring 34. The radial surface 30c of the end part ring 30 bears axially directly against the radial surface 32b of the middle part ring 32. The radial surface 34b of the other end part ring 34 bears directly against the radial surface 32c of the middle part ring. The radial surfaces 30b, 34c form end surfaces of the outer ring 16 which are offset axially with regard to the corresponding radial surfaces 14b, 14c of the inner ring 14. As an alternative to this, the radial surfaces 30b and 14b, 34c and 14c of the outer and inner rings could be coplanar. The outer surfaces 30a to 34a of the part rings form the cylindrical outer surface of the outer ring 16.

The outer ring 16 comprises a staged bore which is formed by the bores of the part rings 30 to 34. Annular outer raceways 36, 38 are formed in the bore of the outer ring 16. The raceways 36, 38 are formed in the bore of the middle part ring 32. The raceways 36, 38 are symmetrical with respect to the transversal radial plane passing between the rows of rollers 18, 20. Each raceway 36, 38 extends obliquely toward the exterior from the bore of the middle part ring 32 and is connected to the small diameter edge of the associated radial mounting surface 32b, 32c by a concave throat. Each raceway 36, 38 is in the form of a truncated cone and in a straight section has a straight inner profile which is in linear contact with the rolling surfaces 18a, 20a of the rollers. The raceways 22, 24 of the inner ring and the raceways 36, 38 of the outer ring are respectively opposite, parallel and symmetrical with respect to the axes of rotation 18d, 20d of the rollers.

The outer ring 16 also comprises guide faces 40, 42 which are formed in the bore of the outer ring 16 and are able to move axially into contact against the end faces 18c, 20c of the rollers with respect to the axes of rotation 18d, 20d. The guide face 40, respectively 42, is formed in the bore of the end part ring 30, respectively 34. The guide faces 40, 42 are symmetrical with respect to the transversal radial plane passing between the rows of rollers 18, 20. Each guide face 40, 42 is rectilinear and is arranged perpendicularly with respect to the associated raceways 36, 38. Each guide face 40, 42 extends obliquely toward the exterior from the bore of the end part ring 30, 34 and is connected to the small diameter edge of the associated radial mounting surface 30c, 34b by a concave throat. Each guide face 40, 42 extends radially with regard to the axes of rotation 18d, 20d of the rollers. Each guide face 40, 42 and the associated raceway 36, 38 delimit a V-shaped groove which is oriented radially toward the interior. The outer guide faces 40, 42 and the inside guide faces 26, 28 are respectively opposite and parallel.

The raceway 22 and the guide face 26 of the inner ring, with the raceway 36 and the guide face 40 of the outer ring, define a first annular space inside of which is arranged the row of rollers 18. Each roller 18 is mounted in direct contact with the raceways 22, 36 and is maintained laterally in position by the guide faces 26, 40. Each guide face 26, 40 forms a support surface for the end faces 18b, 18c of the rollers. The rollers 18 extend axially on both sides of the radial mounting surfaces 30c, 32b of the part rings 30, 32 of the outer ring. Each radial surface 30c, 32b is situated axially at the level of or at the site of the row of rollers 18.

In a similar manner, the raceway 24 and the guide face 28 of the inner ring, with the raceway 38 and the guide face 42 of the outer ring, delimit a second annular space, inside of which is arranged the row of rollers 20. The rollers 20 are in direct contact with the raceways 24, 38 and are maintained laterally by the guide faces 28, 42. The rollers 20 extend axially on both sides of the radial mounting surfaces 32c, 34b of the part rings 32, 34 of the outer ring.

The bearing 10 also comprises at least one fixing screw 44 for assembling the part rings 30 to 34 of the outer ring. The screw 44 extends axially within the thickness of each of the part rings. For this purpose, each part ring 30 to 34 comprises an axial through-hole 30d to 34d for the mounting of the screw 44. The hole 34d has a staged form for the mounting of the head of the screw axially inside the part ring 34. The hole 30c comprises a thread for screwing the threaded end of the screw 44.

The design of the outer ring 16 from at least three distinct parts or part rings 30, 32, 34 is particularly advantageous insofar as it is no longer necessary to provide, within the thickness of the outer ring or the inner ring, radial openings for mounting the rollers 18, 20. Thus, the raceways 36, 38 of the outer ring and the raceways 22, 24 of the inner ring are continued in the circumferential direction. The bearing 10 withstands elevated axial and radial forces.

In order to carry out the assembling of the bearing 10, the procedure is as follows. In a first stage, the first row of rollers 18 is mounted between the inner ring 14 and the part ring 30 of the outer ring. The row of rollers 18 is mounted against the raceway 22 and is maintained laterally by the guide faces 26, 40. Then, during a second stage, the part ring 32 of the outer ring is moved so as to be bear axially against the radial mounting surface 30c of the part ring 30 and against the rolling surfaces 18a of the rollers. The raceway 36 of the part ring 32 is therefore in contact with the row of rollers 18. During a third stage, the second row of rollers 20 is mounted between the part ring 32 and the inner ring 14 axially on the side opposite to the first row of rollers 18. The row of rollers 20 is mounted between the raceways 24 and 38. During a fourth stage, the part ring 34 is mounted against the radial mounting surface 32c of the part ring 32. Finally, during a fifth stage, the part rings 32 to 34 are themselves assembled by means of the fixing screw 44.

In the embodiment shown, solely the middle part ring 32 allows for the transmission of axial and radial forces between the outer ring and the two rows of rollers 18, 20. The outer raceways 36, 38 are arranged on one single part ring of the outer ring 16 that is the middle part ring 32. Thus, it is possible to realize the part ring 32 in a material which has a mechanical strength which is in excess of that of the other part rings 30, 34 of the outer ring and/or to provide specifically surface treatments to the raceways 36, 38 of the part ring 32. Thus, the other part rings 30, 34 of the outer ring can be obtained at low cost, which reduces the overall cost of the bearing. Moreover, if the raceways 36, 38 of the part ring 32 are ruined and require replacement, only the part ring 32 comprising the paths is changed.

Figure 2:
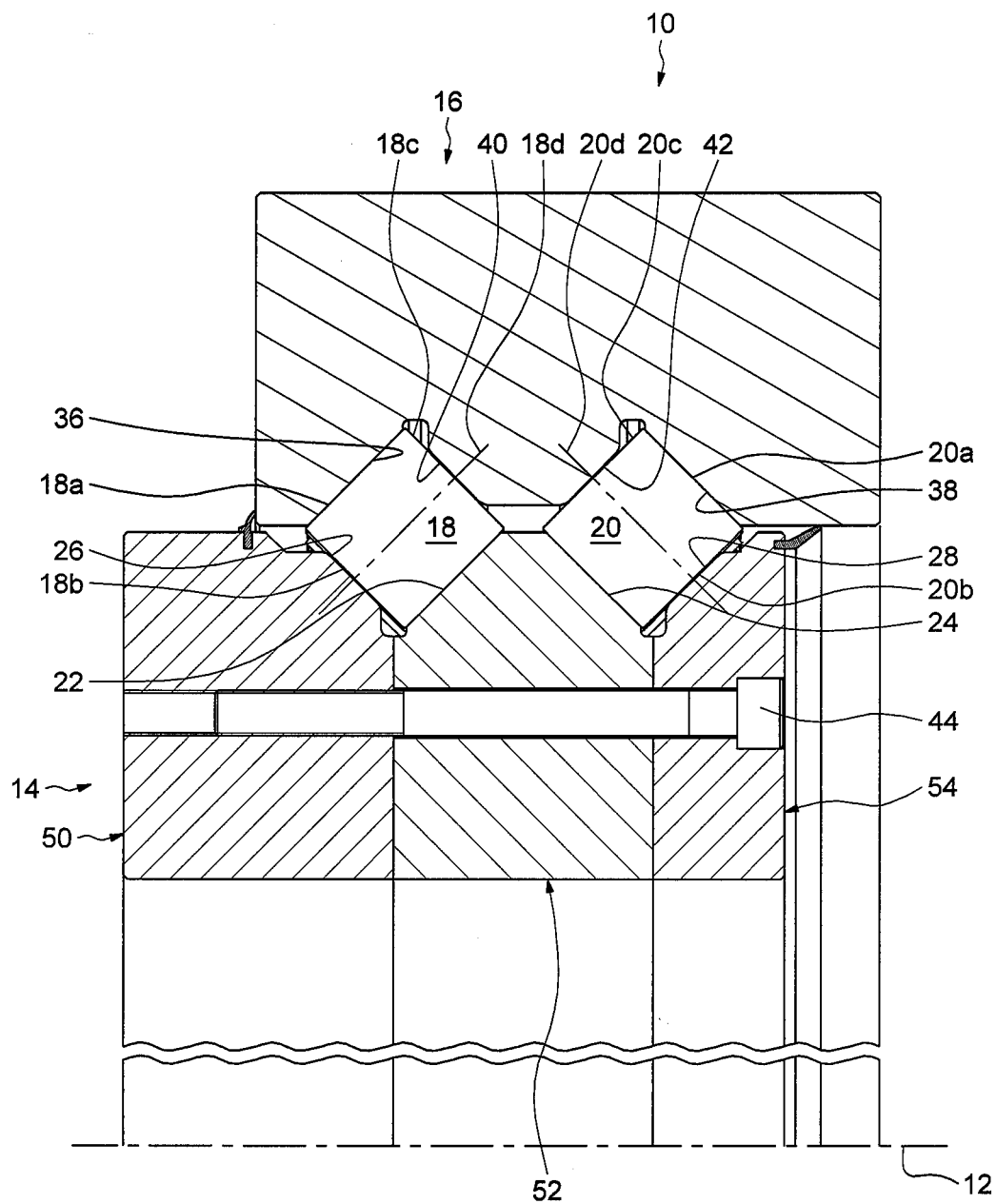
FIG. 2 is an axial sectional half-view of a rolling bearing according to a second embodiment of the invention.

In the first embodiment shown, the bearing 10 comprises two rows of rollers 18, 20, the contacts of which are O-type. In the second embodiment shown in FIG. 2, in which identical elements are given the same references, the contacts of the bearing 10 are X-type. The outer ring 16 is realized here in one single part and the inner ring 14 comprises three part rings 50, 52, 54 which are mounted bearing axially against one another in a manner similar to the first embodiment. In the embodiment, as the contacts of the rows of rollers 18, 20 are O-type, the axial arrangement of the raceways and of the guide faces on each of the inner 14 and outer 16 rings is reversed with regard to the preceding embodiment. On the outer ring 16, which is realized in one part, the guide faces 40, 42 are situated axially between the raceways 36, 38. The raceways 22, 24 of the inner ring are formed on the middle part ring 52 and the guide faces 26, 28 are formed respectively on the end part rings 50, 54.

Figure 3:
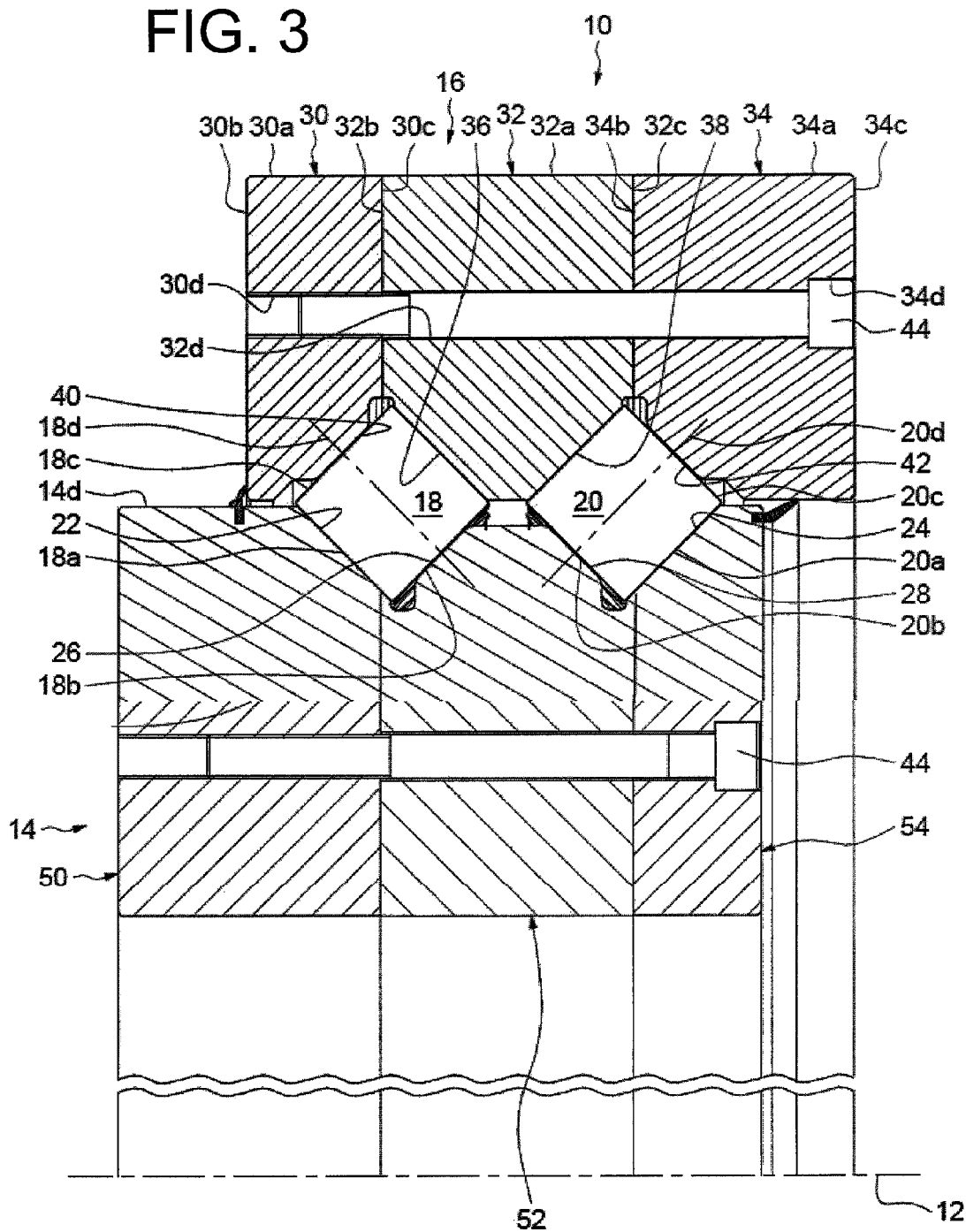
FIG. 3 is an axial sectional half-view of a rolling bearing according to a third embodiment of the invention.

In the two embodiments shown, just one of the inner and outer rings is subdivided axially into several part rings. As a variant, and as shown in FIG. 3, it could be possible to provide a bearing in which each of the inner and outer rings comprises a plurality of sections or part rings assembled together, the number of part rings of each ring being strictly in excess of the number of rows of rollers which is itself at least equal to two. For each ring of the bearing, the number of part rings $N_{rings}$ is therefore defined by $N_{rings} \geq N_{rows}+1$ where $N_{rows}$ is the number of rows of bearings and $N_{rows} \geq 2$.

In the embodiments shown, the rolling bearing comprises two rows of rolling elements which are provided between the rings. As a variant, it is possible to provide a larger number of rows of rollers whilst nevertheless keeping, for the ring or rings realized in several parts, a number of parts strictly in excess of the number of rows of rollers. Moreover, in the embodiments shown, the rolling elements are angular contact rollers in order to withstand radial and axial stresses at the same time. As a variant, it could also be possible, without departing from the framework of the invention, to utilize other types of rolling elements in order to withstand such combined stresses, for example balls. In this case, the rolling bearing is an angular contact ball bearing. In another variant, it could also be possible to provide a bearing which is intended to withstand purely axial or radial loads.

The invention claimed is:

1. A rolling bearing comprising:
an inner ring,
an outer ring, and
a plurality of rows of rolling elements each arranged between raceways disposed on the rings, the number of rows of rolling elements being in excess of or equal to two, wherein the
at least one of the inner and outer rings includes a plurality of part rings which are mounted bearing axially against one another, the number of part rings being defined by $N_{rings} \geq N_{rows}+1$, and wherein at least one of the plurality of part rings does not provide a raceway surface for any of the plurality of rows of rolling elements.

2. The rolling bearing according to claim 1, wherein each part ring of the ring includes at least one radial mounting surface bearing axially against a corresponding radial mounting surface of one of the other part rings.

3. The rolling bearing according to claim 2, wherein the rolling elements of each row extend axially on both sides of the radial mounting surface of the associated part ring.

4. The rolling bearing according to claim 1, wherein at least one of the part rings of the ring provides two raceways for two adjacent rows of rolling elements.

5. The rolling bearing according to claim 4, wherein the part ring has a mechanical strength in excess of that of other part rings of the ring.

6. The rolling bearing according to claim 1, wherein the at least two raceways of the ring are continued in the circumferential direction.

7. The rolling bearing according to claim 1, wherein the rolling elements of each row are in direct contact with the associated raceways of the inner and outer rings.

8. The rolling bearing according to claim 1, further comprising means for assembling the part rings of the ring.

9. The rolling bearing according to claim 8, wherein the assembling means includes at least one fixing screw which extends axially within the thickness of the ring.

10. The rolling bearing according to claim 1, wherein the rolling elements are angular contact rollers suited for withstanding radial and axial forces at the same time.

11. The rolling bearing according to claim 10, wherein at least two part rings of the ring each include a guide face which forms support for an end face of each roller.

12. The rolling bearing according to claim 1, wherein each of the inner and outer rings provides a plurality of part rings mounted bearing axially against one another, the number of part rings of each inner and outer ring being defined by $N_{rings} \geq N_{rows}+1$.

13. The rolling bearing according to claim 1, wherein a quantity of part rings that don't provide a raceway surface for any of the plurality of rows of rolling elements being greater than or equal to the number of rows of rolling elements.

14. A method for mounting a rolling bearing having an inner ring, an outer ring, and a plurality of rows of rolling elements each arranged between raceways disposed on the rings, the number of rows of rolling elements being in excess of or equal to two, wherein the at least one of the inner and outer rings includes a plurality of part rings which are mounted bearing axially against one another, the number of part rings being defined by $N_{rings} \geq N_{rows}+1$ comprising:
   mounting a first row of rolling elements between a first part ring of the ring and the other ring,
   mounting a second part ring of the ring bearing axially against the first part ring on the side of the first row of rolling elements, wherein
   a second row of rolling elements is mounted between the second part ring and the other ring on the side axially opposite to the first row of rolling elements, and
   mounting a third part ring of the ring bearing axially against the second part ring on the side of the second row of rolling elements,
   wherein the second part ring provides raceways for the first and second row of rolling elements and the first and the third part rings do not provide raceways for the first and second row of rolling elements.

\* \* \* \* \*